United States Patent
Prinstil

(10) Patent No.: US 9,037,423 B2
(45) Date of Patent: May 19, 2015

(54) FUEL STORAGE TANK WATER DETECTOR WITH TRIGGERED DENSITY

(71) Applicant: Ambroise Prinstil, East Hartford, CT (US)

(72) Inventor: Ambroise Prinstil, East Hartford, CT (US)

( * ) Notice: Subject to any disclaimer, the term of this patent is extended or adjusted under 35 U.S.C. 154(b) by 276 days.

(21) Appl. No.: 13/747,437

(22) Filed: Jan. 22, 2013

(65) Prior Publication Data

US 2014/0207395 A1  Jul. 24, 2014

(51) Int. Cl.
| | |
|---|---|
| *G01F 23/76* | (2006.01) |
| *G01F 23/68* | (2006.01) |
| *G01F 23/296* | (2006.01) |
| *G01F 23/72* | (2006.01) |
| *G01F 23/00* | (2006.01) |

(52) U.S. Cl.
CPC .............. *G01F 23/76* (2013.01); *G01F 23/68* (2013.01); *G01F 23/2963* (2013.01); *G01F 23/72* (2013.01); *G01F 23/0069* (2013.01)

(58) Field of Classification Search
CPC ..... G01F 23/2963; G01F 23/72; G01F 23/68; G01N 9/14
USPC ................... 73/305, 309, 311, 313, 314, 319
See application file for complete search history.

(56) References Cited

U.S. PATENT DOCUMENTS

| | | | | |
|---|---|---|---|---|
| 4,055,708 | A * | 10/1977 | Yamamoto | 429/10 |
| 5,253,522 | A * | 10/1993 | Nyce et al. | 73/453 |
| 5,421,193 | A * | 6/1995 | Carlin et al. | 73/49.2 |
| 5,742,951 | A * | 4/1998 | Wright et al. | 4/381 |
| 5,929,763 | A * | 7/1999 | Koski | 340/618 |
| 7,278,311 | B1 * | 10/2007 | Demin | 73/322.5 |
| 8,539,828 | B2 * | 9/2013 | Prinstil et al. | 73/305 |
| 8,601,867 | B2 * | 12/2013 | Prinstil et al. | 73/311 |
| 2003/0131403 | A1 * | 7/2003 | Ho | 4/325 |
| 2004/0012101 | A1 * | 1/2004 | Wright | 261/36.1 |
| 2006/0169039 | A1 * | 8/2006 | Zalenski et al. | 73/290 R |

FOREIGN PATENT DOCUMENTS

WO    WO 03010464 A1 *  2/2003

* cited by examiner

*Primary Examiner* — Charlie Y Peng

(57) ABSTRACT

The present discloses alternate constructions of water detector floats for fuel storage tanks. Embodiments show various techniques of altering the density of a sub-assembly floatation device while maintaining the system's efficient ability to detect water presence in conjunction with a Magnetostrictive probe. In the float's upward motion due to water presence or high density fuel in the tank, at some predetermined locations, its density is altered by way of strategically located free weights along its travel path.

29 Claims, 12 Drawing Sheets

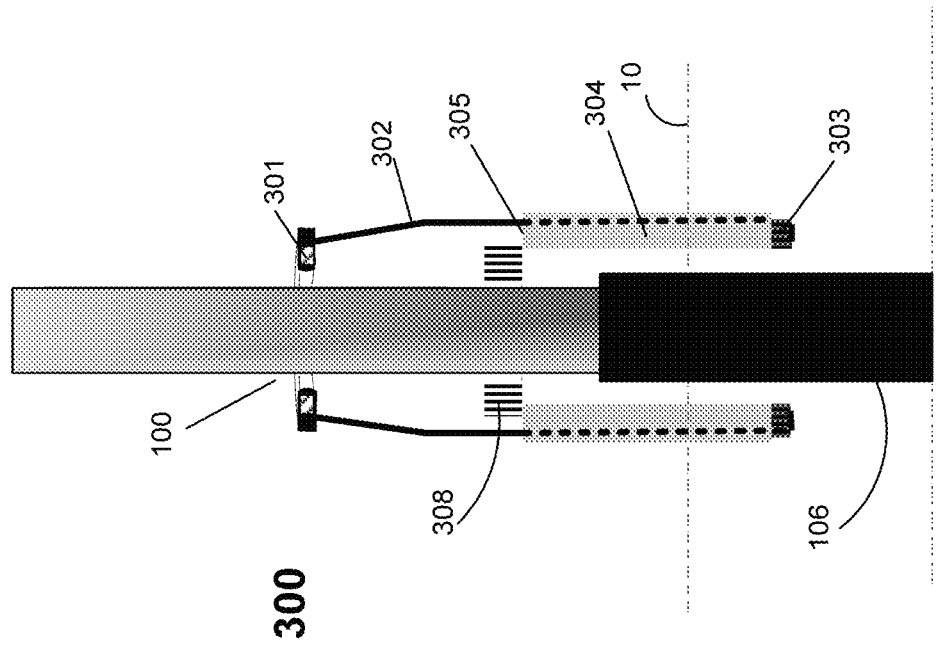
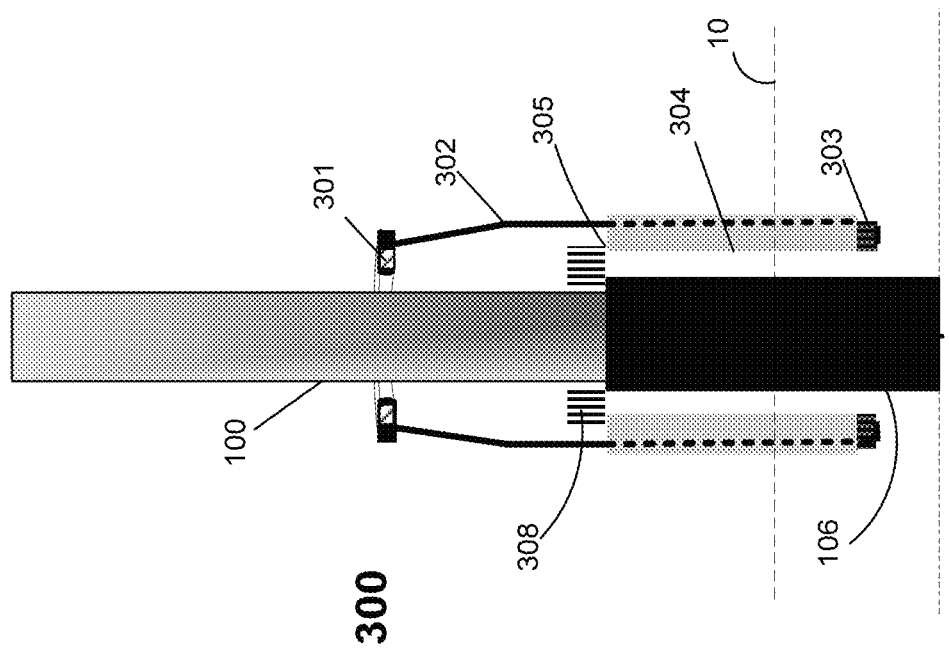

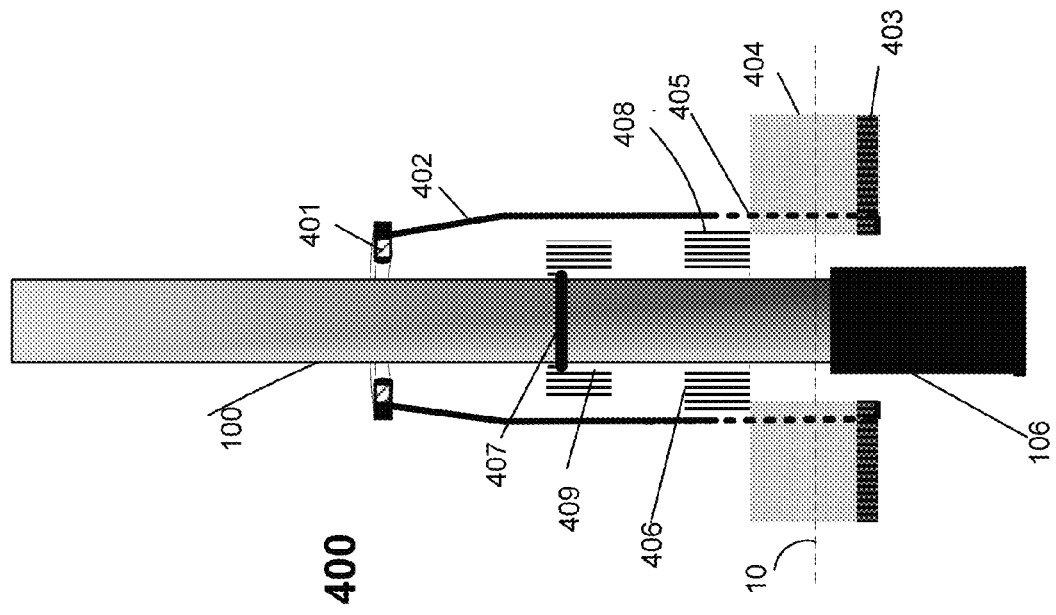
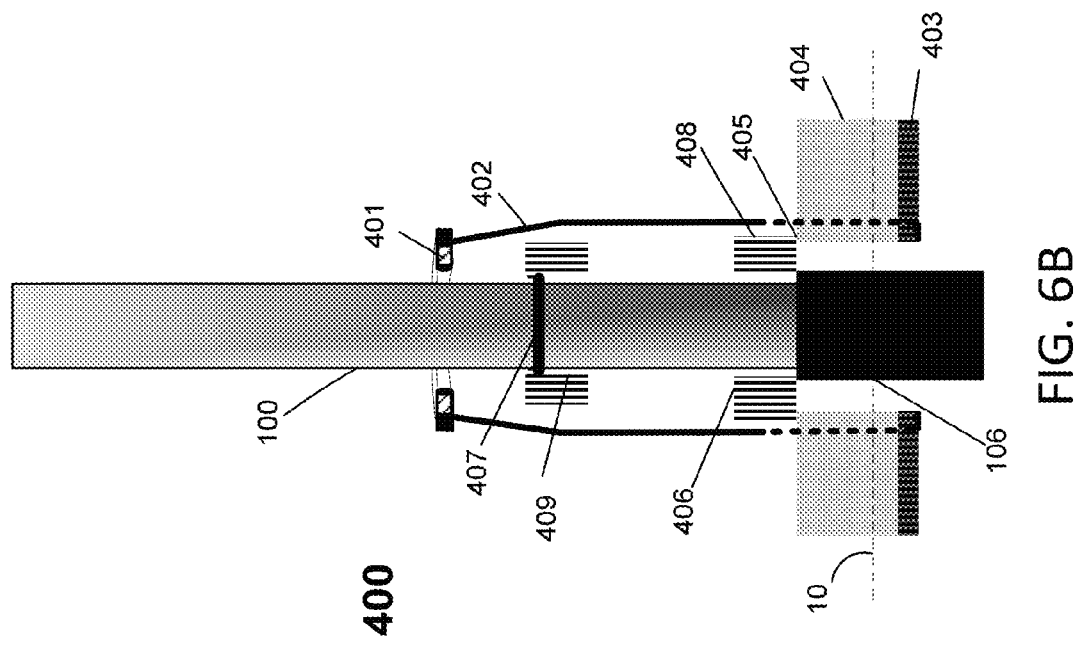

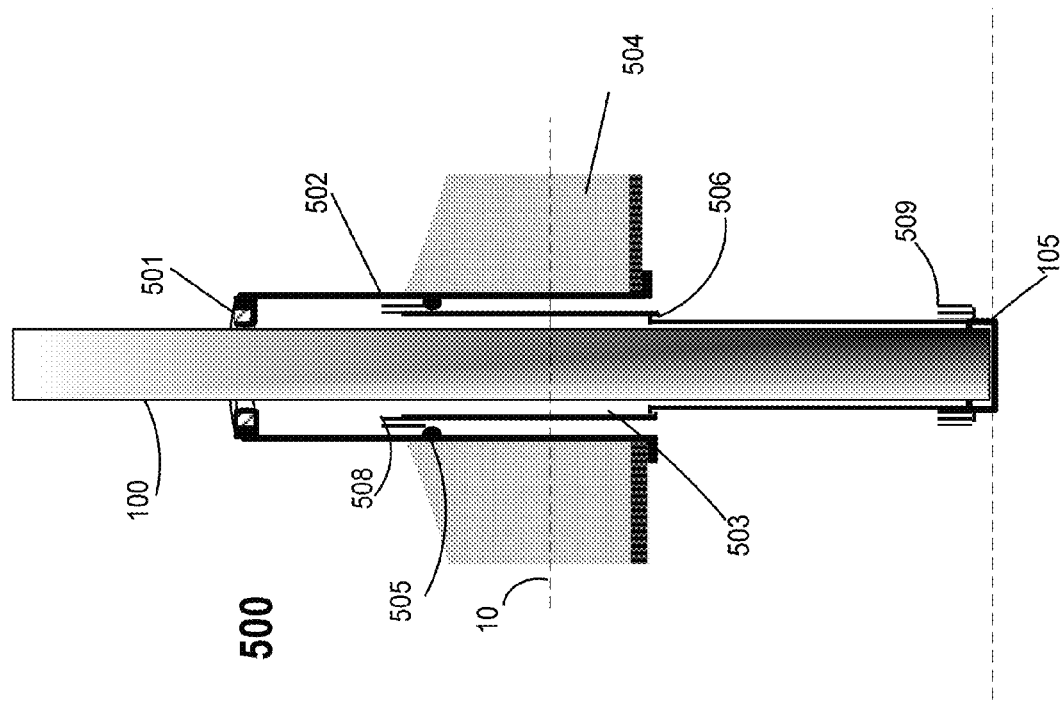
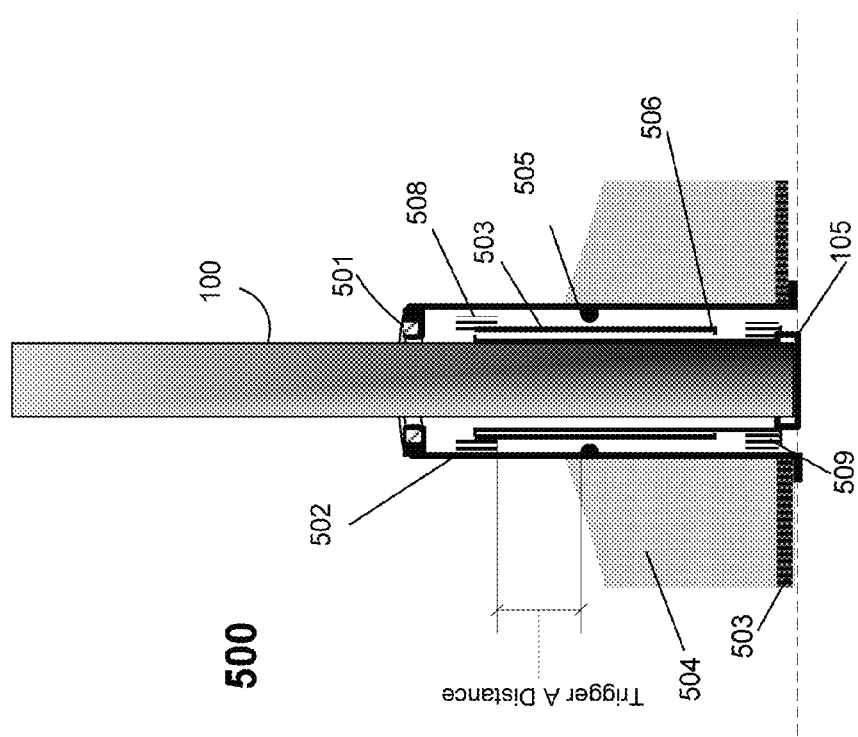

FUEL STORAGE TANK WATER DETECTOR WITH TRIGGERED DENSITY

PRIORITY CLAIM

The application described within claims the benefit of provisional application Ser. No. 61/602,154, filed Feb. 23, 2012.

FIELD OF THE INVENTION

This present invention is in relation to monitoring devices capable of determining the fuel level inside of a storage tank. It is intended to be utilized in conjunction with a Magnetostrictive probe where such a device is adapted to determine the level and quality of fuels. In this case, this invention coupled with the Magnetostrictive probe will facilitate the determination of water levels inside of the reservoir.

BACKGROUND OF INVENTION

Storage tanks used in fueling environments are usually located underground. Liquid fuels such as gasoline or diesel are stored in bulk until they are dispensed to customers by means of the station's fueling equipment. Environmental compliances require that monitoring systems be in place to determine inventory and leakage. Many types of equipment are used to perform this measurement. In this invention, we are going to focus on the use of a Magnetostrictive probe, which is the most commonly used detection apparatus employed in this industry.

Similar to its use in this application, the Magnetostrictive probe is fitted into a tank, and is comprised of a shaft that protrudes over the height of the entire tank. Detections and logic circuitries are located inside of a canister usually situated on top of the shaft. The probe and other accessories, like floats are introduced into the tank via a riser pipe connected to the tank. The means of ascertaining the levels, "fuel" and "water", are commonly through the utilization of floating bodies each carrying a magnet. The floats are often constructed of materials such as Nitrophyl, Buna-N, Urethane and Stainless Steel. In the tank, floats are calibrated to have densities that are less than the fuel they are intended to monitor in order to float at the surface of said liquid; in this case gasoline products. Floats are allowed to sink into a fuel layer to stop at the interface of another fluid where the buoyant forces exerted by the combined fuels matches the density of the float in question. In this instance, the float remains at the interface of the two fuels. By this method, the systems are not limited to only two floats. A multiplicity of such floats could be adapted into a single probe intended to be used in a tank having various fluids of different densities.

The Magnetostrictive probe detection apparatus is set to locate the presence of a magnet along the shaft by means of an interaction between the permanent magnetic field emanating from the magnet and the circumferential field introduced into the Nichrome wire within the shaft by the application of a current pulse into that said wire. With the float slidably disposed along the probe's shaft and carrying the magnet that is intended to report its location, the system is able to locate the exact position of the float along the shaft. This is accomplished by means of the known propagation velocity of the twist resulting from the interaction between the two magnetic fields mentioned earlier. The delta time from when the current pulse was applied to the time a resulting twist is detected represents the time interval taken for the wave to propagate along the wire medium from its origin. When that time "T" is divided by the known propagation velocity in that wire, the magnet's exact location is then calculated by the system.

The intent of this invention is purely for fuel quality determination. With water capable of entering the tank by many means, such as a leaky tank, condensation, a poorly sealed tank, vent pipe etc. the possibility for water accumulation at the tank's bottom had always been a problem faced by this industry. However, previous to the time when ethanol was introduced as a means of controlling pollution, the water used to remain at the bottom of the tank where it would be accumulated and gets detected by the float that was designed to work in the interface of gasoline and water. Ethanol's affinity to absorb water creates a different problem that renders inoperative the current floats used in the industry. This invention' sole intent is to help overcome this problem.

When water enters a tank containing 10% ethanol by volume, or E10, the water is absorbed by the alcohol content of the fuel and remains suspended in the gasoline until the water and ethanol ratio exceeds a threshold. When this state is reached, the combined solution precipitates out of the fuel and resides at the bottom of the tank. This solution has a density lower than that of water and the interface behaves very closely to that of gasoline, which confuses present water detection systems.

This newly formed aqueous solution is different than water in density, thus making it difficult for a float that was designed to work at the boundary of gasoline and water to have the right buoyant force necessary to lift it from the tank's bottom. In some instances, when the ratio of water in the solution is high enough, the float is lifted but it takes a considerable level of this solution to achieve this. In that case, the true height of this solution is not properly reported by the probe and jeopardizes the quality of the fuel dispensed and the integrity of the gas station's brand.

SUMMARY OF INVENTION

With this invention, a solution is offered to the problem of not detecting the presence of water in a tank. Current floats are not buoyant enough to perform in this newly formed aqueous liquid. By design, the industry's present floats are not supposed to perform well in the secondary fluid with densities lower than that of water.

The proposed interface float uses the technique of reducing the density of the water float to closely match that of the lowest water-ethanol mixture. By this approach, floats of any size can be adapted to take advantage of this technique. As a means of preventing the float from rising to the surface of the fuel in the event that the density of the fuel becomes very close to that of the float, trigger weights are strategically placed to stop the float from rising to the surface. Those trigger weights may be manufactured with any materials suitable to work in the fluid being measured. Their sizes depend on the mass needed and the space available to fit a given volume that will satisfy that mass. Triggers could range from just one to multiple points.

An embodiment of this design concept uses the Magnetostrictive probe to read the float's magnet via the Nichrome wire. This magnet is retrofitted into a floatation system that is made very buoyant, permitting it to respond to the lowest water-ethanol layer mixture that may have a density nearing 780 $kg/m^3$.

Being so buoyant, the float does present the risk of being lifted to the tank' surface in the event that the fuel density exceeds that of the calibrated float. To prevent this from happening, the float is guarded by a triggered weight that will prevent it from rising to the surface. This weight adds to the mass of the float, bringing it to a level that is exceeding the highest fuel density expected in the tank, while still allowing the float to rise in the presence of the lightest density water-ethanol mixture.

One other embodiment presents this invention with two trigger points. Used in this way, the float could be made to remain very sensitive to various water-ethanol densities while keeping the system from having large water offsets due to the added mass. The trigger points are separated by a distance that allows the float to travel upward along the probe for a predetermined distance before reaching the second trigger point. After the first trigger point, any upward travelling of the float will place the station in a dangerous situation where remedial actions should have been taken even before the float reaches the second point.

Yet in another embodiment, the first trigger point engages a telescopic assembly which carries the trigger weights, one on each leg of the telescope. This method offers a degree of stability to the float in its upward travel. In this approach, the upper weight is lifted first, while the second trigger point is where the telescopic tubes meet.

Another embodiment presents the trigger weights suspended by a flexible harness separating the weights. The weights are held in place by an anchor point strategically located above the float in such a way that the distance separating the top of the float to the first trigger point would be predetermined at the design phase. Upon making contact with the first trigger point, if the level of water continues to rise, the harness separating the weights will fold to accommodate the rise. The folding effect continues until the second trigger point is reached.

Yet another embodiment shows the weights carried by a fixture where one trigger point is located internal to the float and the other is externally situated at a predetermined distance above it.

Either single or multiple trigger points, whether they are located internally, above or below the float, the goal is to use weights to trigger variable densities in a float. This approach allows a low density float to be used thus stopping it from rising to the surface due to high density fuel by supplementing to its mass. The density of the fuel could rise because of low temperature, fuel tempering and other factors. Anyone skilled in the art will realize that other aspects of this invention not mentioned constitute other embodiments related to the spirit of the technique utilized and remain within the scope of this invention.

BRIEF DESCRIPTION OF THE DRAWINGS

FIGS. 5A-5C are cross-sectional representations of the single trigger mode of the water float 300 in its various stages of operation.

FIGS. 6A-6E are cross-sectional representations of the dual trigger mode of water float 400 in its various stages of operation.

FIGS. 7A-7B are cross-sectional view of an alternate representation of the dual trigger mode of water float 500 seen in two different stages of operation. In this configuration the trigger weights 508 and 509 are carried by a telescopic assembly 503. Trigger point 505 contacts weight 508 located on top of this arrangement. Trigger point 506 is therefore located below, being the end part of the first leg of the telescopic assembly 503. Together they work in an identical fashion as any two trigger modes of operation.

DETAILED DESCRIPTION OF PREFERRED EMBODIMENTS

This invention is intended to be used in conjunction with a Magnetostrictive probe. Existing probes used in the industry make use of a water interface float to help determine the presence of water and ascertain the level of that layer in the tank. However, with the advent of oxygenated gasoline, most particularly ethanol blended fuels; the industry is facing the problem of not having the probe report the proper level of water in the tank. This is due in part to the affinity of the alcohol with water molecules. When water enters the tank, it forms a bond with ethanol and strips the fuel from its alcohol content leaving behind a depleted gasoline in the tank. That stripped ethanol and the water form an aqueous water layer residing at the bottom of the tank. That water layer could range in density from 780 kg/m3 up to 900 kg/m3. With this wide range of densities, the floats currently used in the industry become very unreliable at detecting the presence of aqueous water layer in a tank.

Figure 5A:
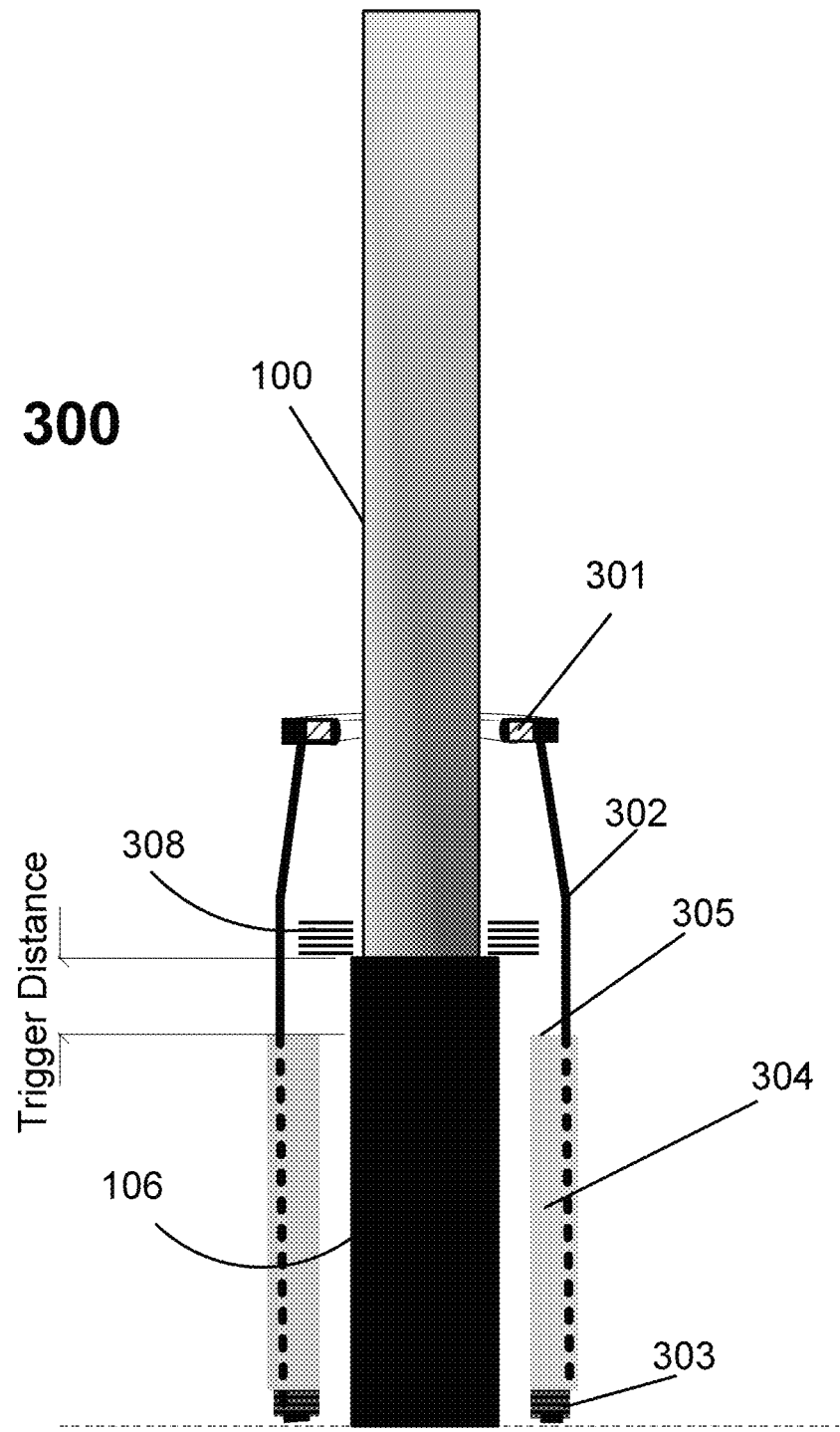

The preferred embodiment of this invention shows a cut-away representation of this design concept as seen in FIG. 5A-5C where the float group 300 is seen retrofitted into a probe group 100. Internal to the float is trigger weight 308 immediately located on its resting location on top of probe boot 106.

Probe boot 106 is set in such a way that with no water in the tank, it extends at a predetermined distance higher than the float's trigger point 305. That distance is there to allow the float to have a range of motion in normal operation. It also allows the float to not be restricted in its upward motion when buoyed by a low density water-ethanol layer.

Residing on top of the boot is weight 308 that stays at that fixed location in normal operation when no water is detected. However, when the water level rises, the float travels up to that distance and this weight gets coupled into the float and adds to its mass.

In its current representation, the float is composed of frame 302 that forms the body of the whole assembly. This body is what keeps together the various float parts. Within the assembly, a cavity is also included where ballasts 303 are inserted to allow calibration of the mass of the whole float assembly. At the very top is inserted a position magnet 301.

In this preferred embodiment, the float will rise as the level of water represented by demarcation line 10 increases in the tank. Once the level reaches the threshold where the trigger point 305 makes contact with weight 301, a small lag is introduced in the free operation of the float and adds to the initial water offset of the float. As the lag is imposed to the float, that level will rise until the buoyant force imposed by the liquid overcomes the added mass of the float.

The intent of having trigger point 305 in close proximity to weight 308, allows for the float's lowest tip to remain near the bottom of the tank in the event the fuel density increases causing the float to rise suddenly. By this approach, the system will be able to detect the rise of water without compromising its detection capability.

High density fuel may be due to a sudden drop in temperature where it would cause the density of the fuel to reach a level matching that of the float. To accommodate for detecting temperature drop, the probe is equipped with an array of temperature detection sensors capable of indicating the fuel temperature inside of the tank. Provision is made in the software algorithm to evaluate the data according to the steps highlighted in flowchart 200 which will be explained later.

Other phenomenon may contribute to the rise in fuel density as well. In some instances where the fuel is being tampered with, addition is made to the tank where a fuel of lower grade, such as Kerosene, may be added to the tank. This is done with the intent to replace the volume of the fuel removed, whereas, this addition causes an increase in fuel density and contributes to the sudden rise of water float 300. FIG. 5B illustrates the float in this position. Note that in normal operation the float does reach that threshold as well. In such a case, the level seen is a true representation of what the float indicates.

Density increase alone would not suffice to cause float 300 to rise past trigger weight 308. If this occurs as illustrated in FIG. 5C, it shows that level 10 of water is truly rising inside the tank. However, when the fill port is near the location where the probe and floats are located, the pressure resulting from the flow of the fuel being delivered may cause an upward force to lift the float and keep it at a position exceeding the trigger point level for the duration of the delivery. Caution should be made in determining that the rise in the float's position is truly a result of high level water before posting an alarm. Reference should be made to flowchart 200 for the logic in this determination.

In an alternate embodiment, the float system 400 comprises of two trigger points 405 and 406. The operation is identical to the case where only one trigger point is used, with the exception that the lags are smaller and contribute to a smoother operation of the float.

Figure 6A:
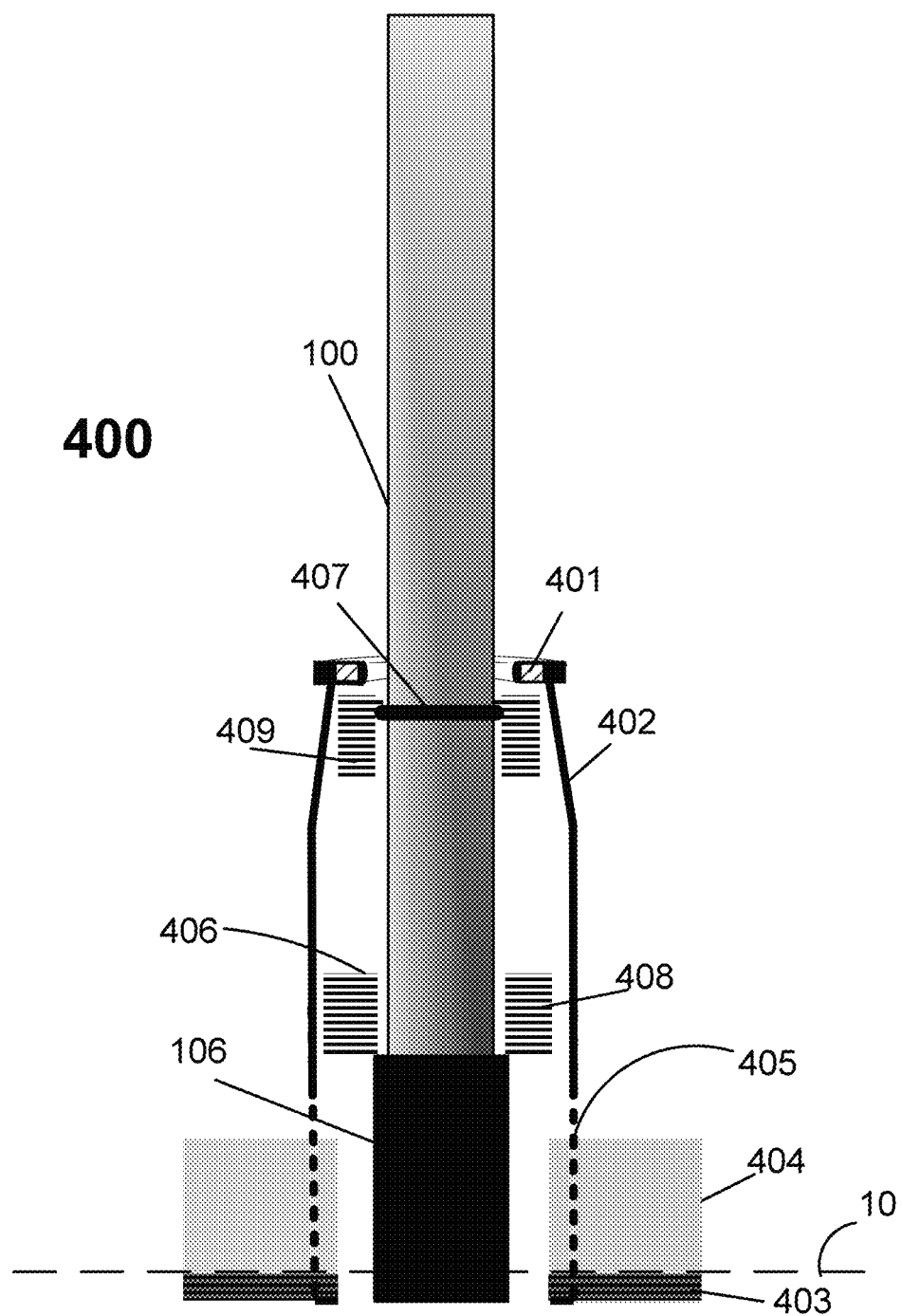
Figure 6D:
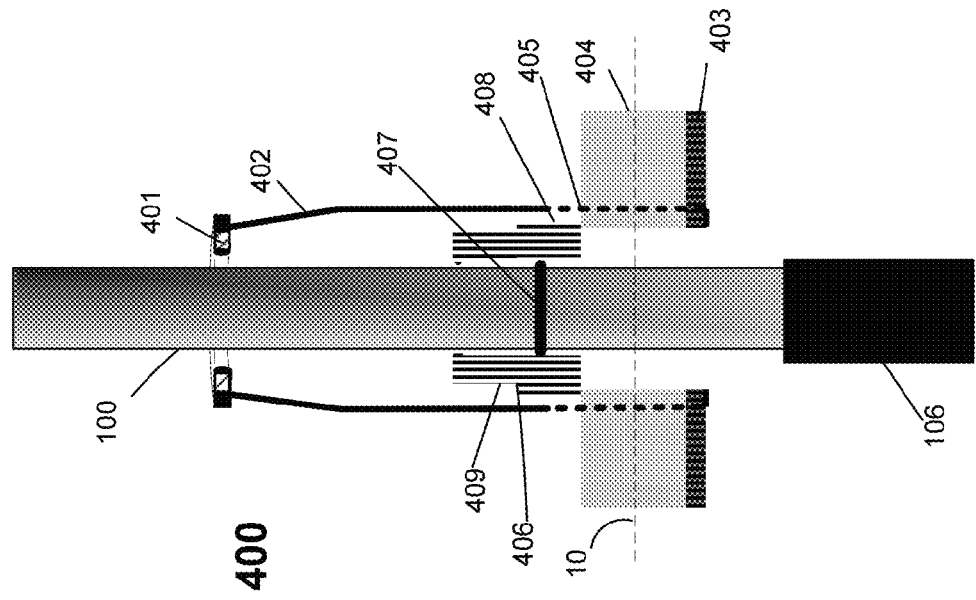

This 400 embodiment is more suitable to work in a larger diameter float since this extra volume offers the privilege of having the float construction shorter and can allow a longer cavity inside the frame to accommodate two trigger weights. Assuming the trigger distance X where trigger point 405 reaches weight 408 as being somewhere between 0.5" to 0.75", the distance it will take for weight 408 to travel up the shaft to reach weight 409 would be in the order of 1.5" to 2" (FIG. 6D), which would be large enough to place the system at a dangerous level where remedial actions should have been taken. Therefore, in this embodiment, the float is never expected to reach this point of contact if proper care is taken to maintain the fueling environment.

Figure 6E:
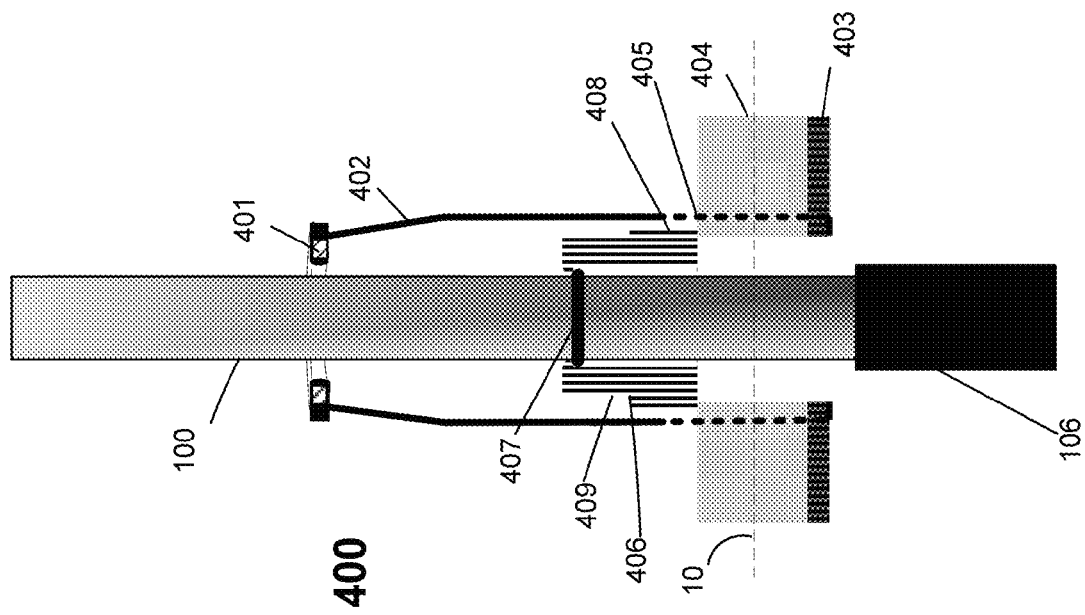
Figure 9:
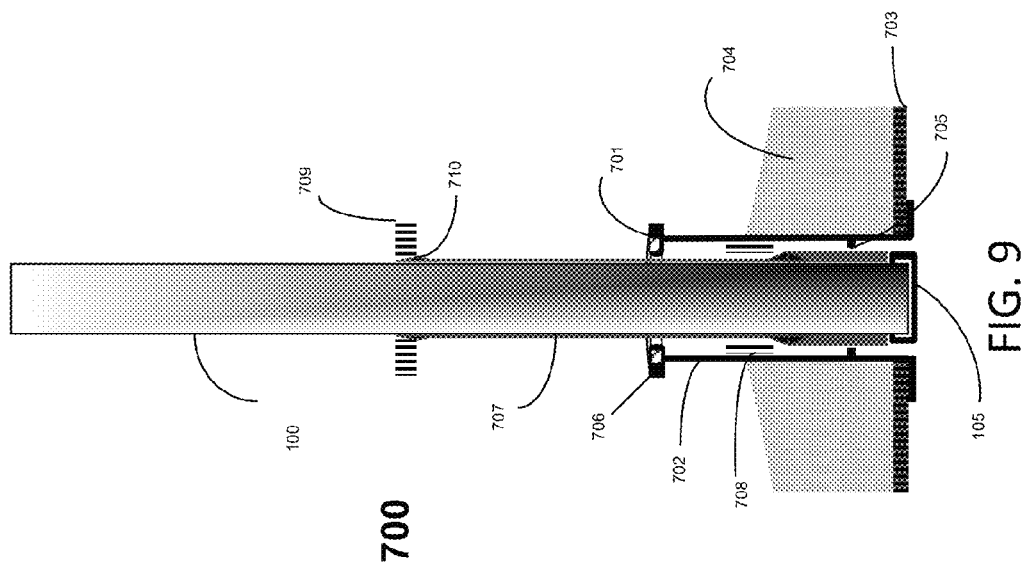
FIG. 9 is also a cross-sectional representation of an alternate mode of representing the dual trigger water float 700. Trigger weight 708 is located internally to the float. The secondary trigger weight 709 is externally located above the float. The two weights are supported by a fixture 707 located in close proximity to the probe's end 100.

FIG. 6E shows the float 400 in a very high region of the probe where the fueling environment would have to discard the entire tank's content in order to remedy the situation. At that level, the risk is present that the dispensed fuel may be an aqueous water-ethanol liquid.

The alternate construction presented in FIGS. 7A and 7B is for float 500 where the trigger weights are supported by a telescopic carrier 503. The operation of this float is identical to construction 400 presented earlier. The difference is that the weights are suspended on float 500 and are lifted by a primary trigger point 505 and a secondary trigger point that is formed by the contact of the two tubes, or point 506.

Figure 8:
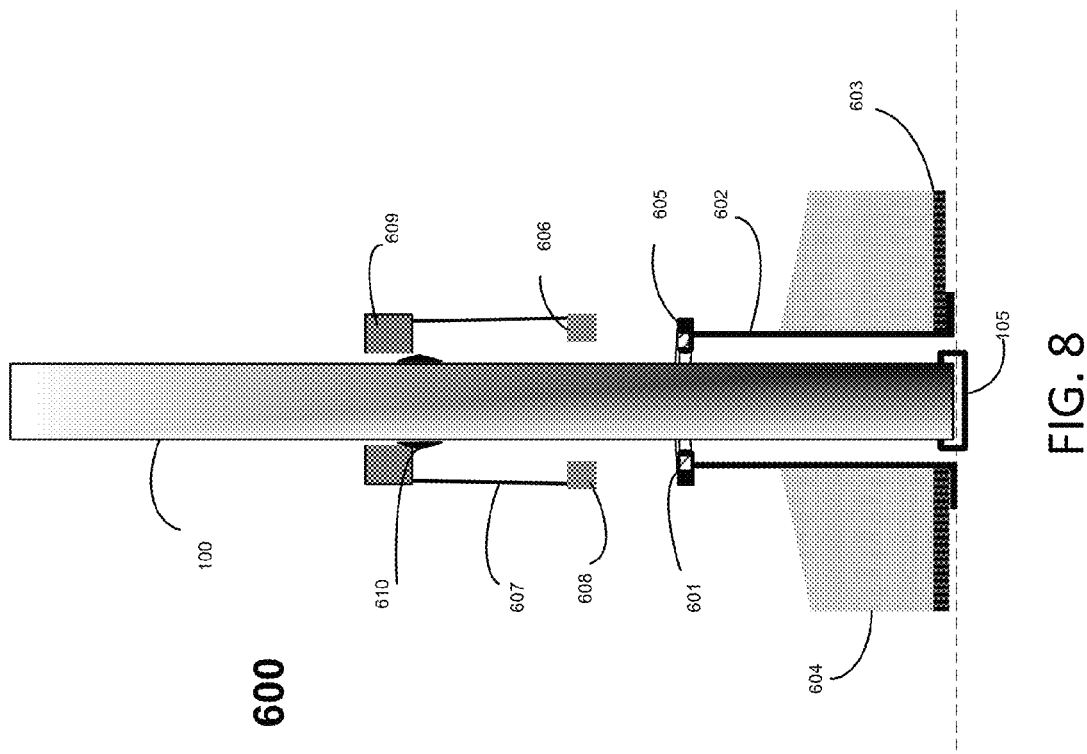
FIG. 8 is a cross-sectional representation of an alternate mode of representing the dual trigger water float 600. The weights 608 and 609 are suspended above the float and joined together by a flexible membrane 607 capable of folding to accommodate the rise of the water float. The anchor point 610 is to be a locking fixture attached to probe 100 at a predetermined location.
Figure 10:
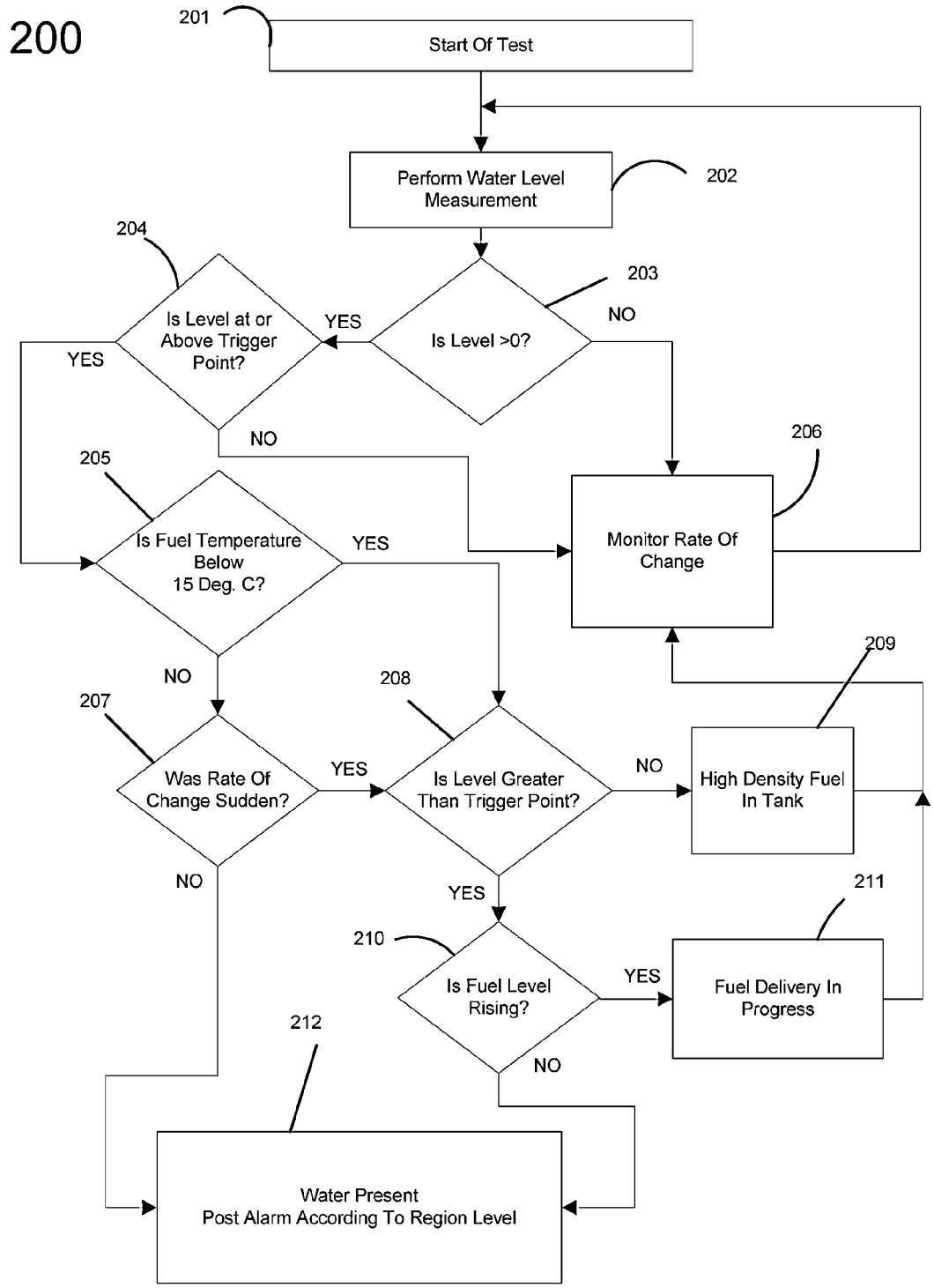
FIG. 10 is a flowchart 200 illustrating the operation of the water floatation system. The tank monitoring console will use the data obtained from the probe and uses the criteria described in this flowchart to evaluate water level.

Float 600 illustrated in FIG. 8 is identical in operation with float 400 and 500. In this configuration, the weights are situated above the float where, as its rises, the float would be coupled with them based on the conditions highlighted in flowchart 200. In this arrangement, a locking fixture 610 is positioned along probe tube 100 where the assembly containing weights 608 and 609 resides.

Membrane 607 of float 600 may be made of any flexible material capable of surviving the fuel environment where the float is intended to be used. The material must remain flexible even when temperature goes below 15° C.

Float 700 operates in an identical fashion as all the other "Two Trigger Point" assemblies mentioned thus far. In this configuration, it is shown with trigger weight 708 inside of float 700 and trigger weight 709 located above the float. The whole weight system is held in place by a fixture 707 assembled in close proximity with probe tube 100 with sufficient spacing to allow float 700 and trigger weights 708 and 709 to move freely about up and down the shaft. Contact between float 700 and trigger weight 708 is made by means of a protruded lip 705 from the float assembly intended to lift the weight when contact is established.

Figure 1:
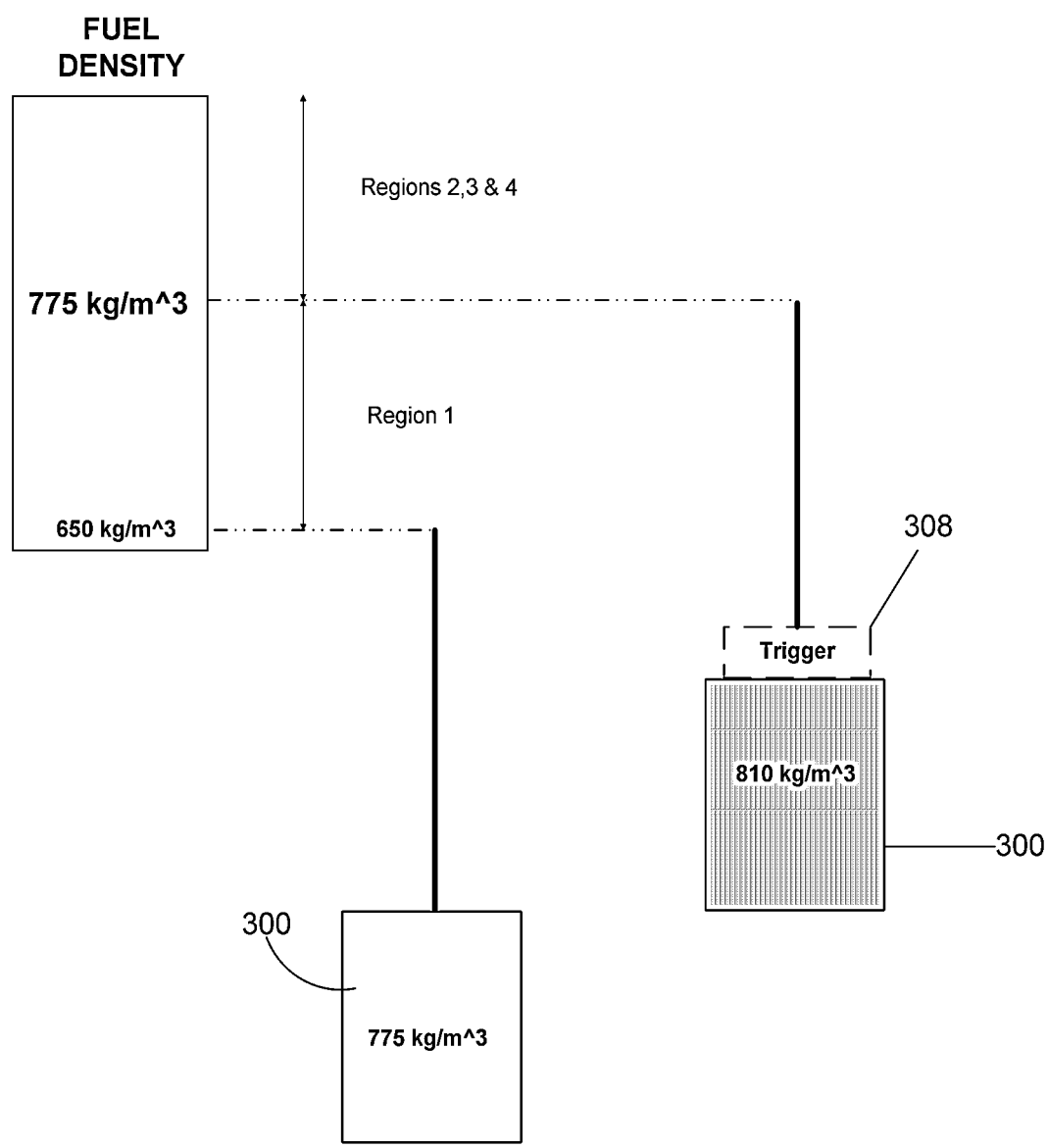
In FIG. 1, the concept driving this invention is illustrated where float 300 with an initial density of 775 kg/m3 is to be used for interface layer measurement. This initial concept makes use of a single density trigger point raising the float density to 810 kg/m3 by adding weight 308 to the assembly. This helps to resolve the problem of having the float rising to the surface of the tank.
Figure 2:
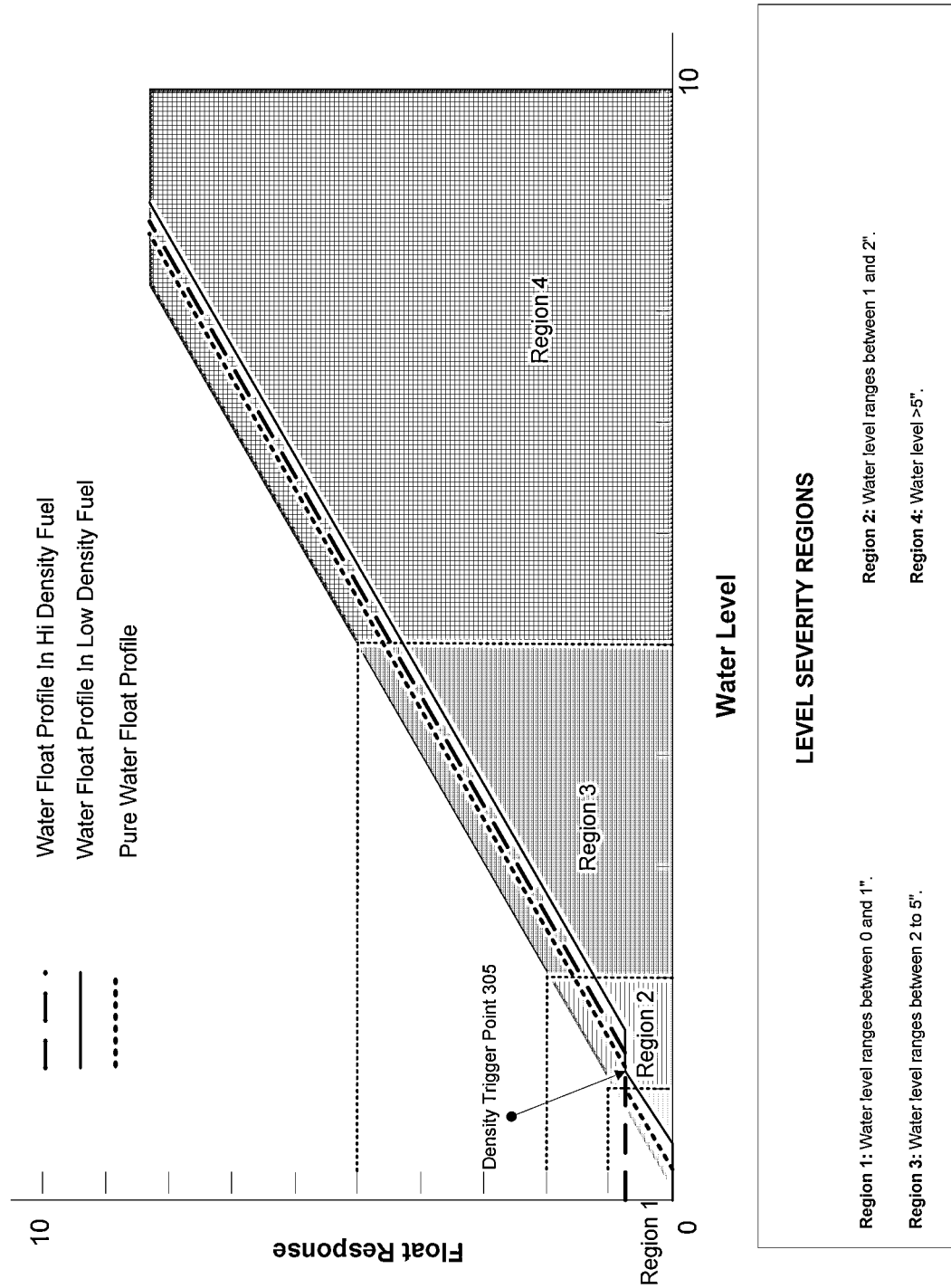
FIG. 2 is a graphical representation of the performance of the single trigger point floatation system. It shows the float's response in relation to the trigger point in various density fuels. It also illustrates the severity regions encountered as the water level increases in the tank.
Figure 3:
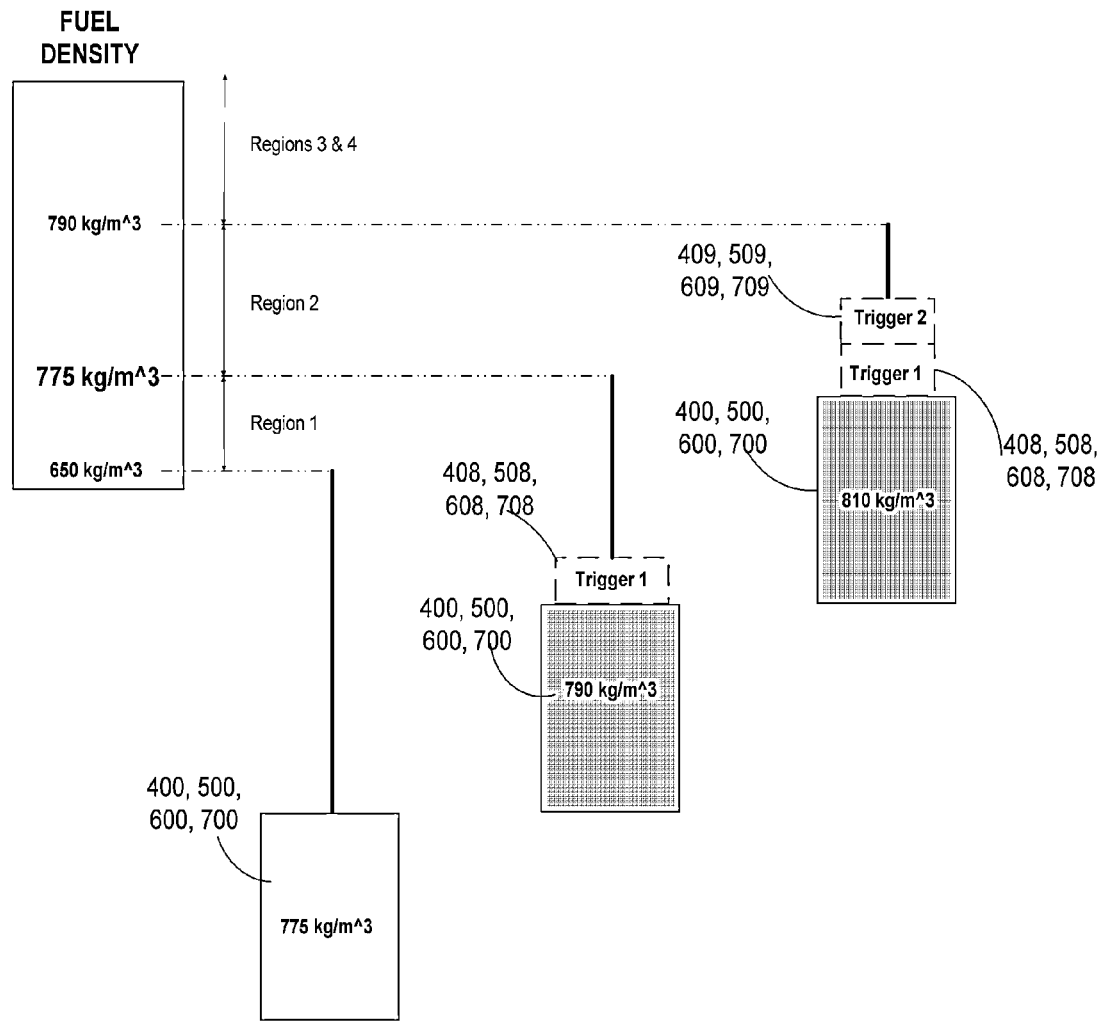
In FIG. 3, the concept driving this invention is illustrated where either floats 400, 500, 600, 700 of initial density of 775 kg/m3 is to be used for interface layer measurement. This concept makes use of dual density trigger points raising the float's density incrementally to 790 kg/m3 as either weight 408, 508, 608, 708 is added to the initial float. Later as either weight 409, 509, 609, 709 is added to the previous combination, the density is raised to 810 kg/m3. This assembly will, as in the first case, contribute to resolve the problem of having the float rising to the surface of the tank.
Figure 4:
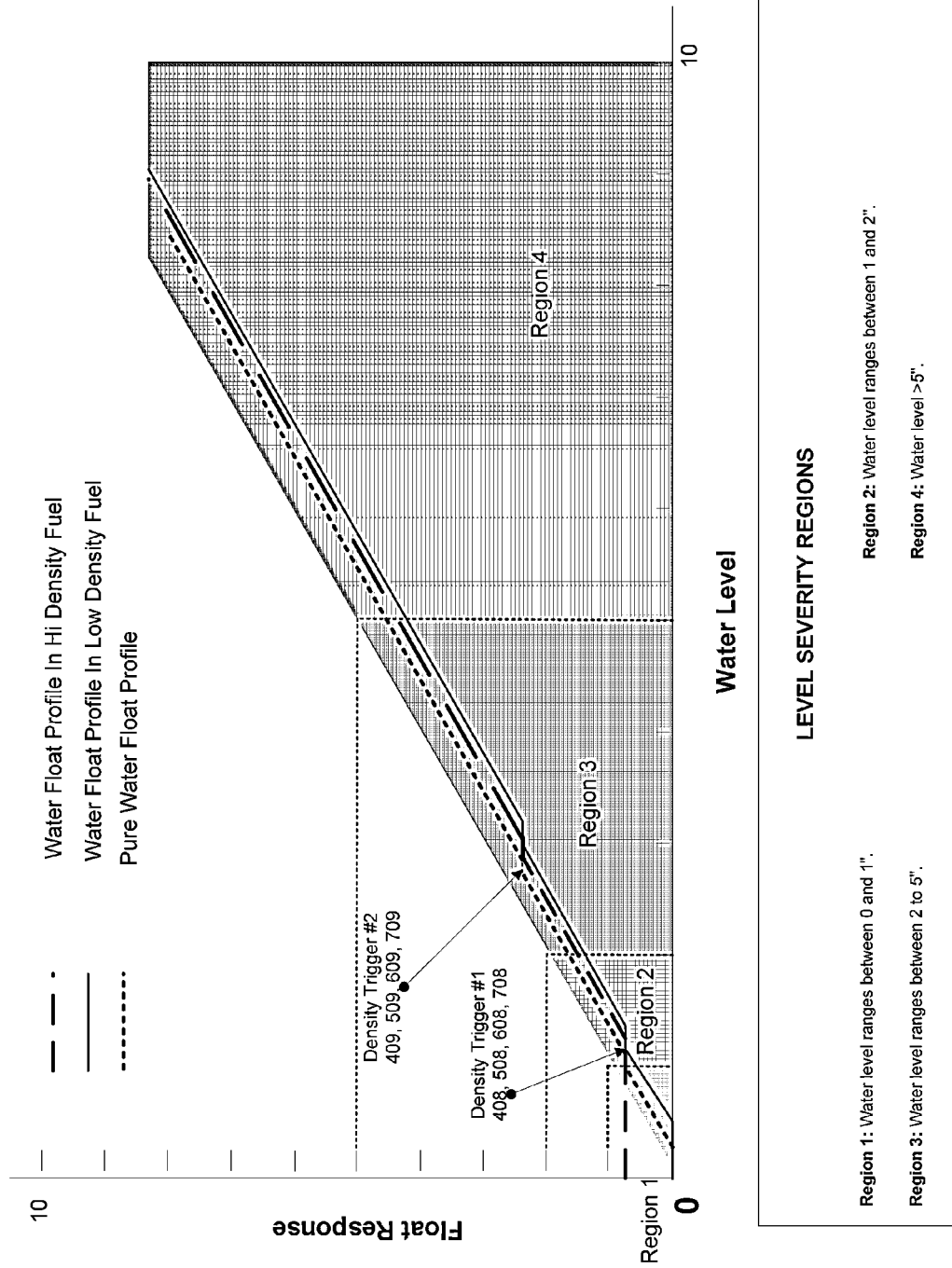
FIG. 4 shows a graphical representation of the performance of the dual trigger points floatation system. It shows the float's response in relation to the trigger points in various water levels. It illustrates the severity regions encountered as that level of water increases in the tank.

In the free operation of the floats, as the level of water increases, different regions of severity are established to allow setting alarms of different degree of severity. The graphical representation of this is seen in FIGS. 2 and 4.

Region 1 where the height ranges from 0 to 1" allows for determining early presence of water. It also serves as the buffer zone where if fuel density rises and causes the float to lift, the prevention apparatus will still keep the float sitting low in the tank where detecting true rise in water would not be compromised.

Region 2 which ranges from 1" to 2" will provide sufficient protection to allow the station attendant to provide early remedial steps to rescue the content of the tank.

Region 3 which ranges from 2" to 5" will alarm a severe case of water level. At this point it is an indication that it is very late in taking the decision to correct the fuel.

Region 4 is where the level is in excess of 5", which is a true indication that fuel of a poor quality or that water may be dispensed to customer's vehicles. At this stage, the tank must be emptied and the contents replaced.

Since there are many factors that could cause the interface float to rise above a safe zone inside the tank, caution should be taken to use the criteria described in flowchart 200 before posting an alarm.

Flowchart 200 shows the decision criteria to evaluate water level as heights are measured by probe 100. At the console level, power is provided to probe 100 and a predetermined sequence of measurement takes place inside the probe to permit reading the various parameters. Fuel, Water, Temperature are cycled as programmed into the firmware embedded in the probe. Once state 201 is initiated, a water level measurement 202 is performed.

Due to the fact that many factors could affect a given reading, an evaluation process is introduced to help interpret a reading. At state 203 a decision is made based on whether the water height 10 has risen past the zero point or the state where the float is resting at the bottom of the tank. If the condition is false or returns a NO, the system moves on to state 206 where that data is recorded as well as the time measurement was taken to allow a rate evaluation of water reading. Then, the system waits until the next cycle when a water measurement may be performed again and repeat the process.

If state 203 returns a YES, then a further evaluation takes place to ascertain whether water is really present in the tank. State 204 verifies if the water is above the first trigger point. If No, it is considered safe since that region is allowed to be only 1" or less. From there rate monitor 206 tag that reading and the cycle repeats.

If state 204 returns a YES, then further evaluations are made by state 205 where the temperature of the fuel is considered. If the temperature was not below 15° C. then state 207 uses the information kept at state 206 where the rate was monitored to determine whether this change happened suddenly. If it was not a sudden step change, then it is clear that water is present and an alarm is posted based on height level.

If state 205 or state 207 return a YES, then a level evaluation is made by state 208 to determine if level has increased past the trigger point. If NO, than it is safe to conclude that the fuel in the tank is of high density. If the temperature was not below the threshold of 15° C. at state 205, then care is to be taken in ascertaining the cause of the high fuel density.

If state 208 returns a YES, then a further check should be made to verify that this rise is not due to an external influence such as a fuel delivery. So if state 210 is YES than a fuel delivery is in progress and therefore the decision to post an alarm should be held until the delivery has ended.

If state 210 reveals that the fuel level was not rising, than it is safe to conclude that water is in the tank. Alarm should be posted according to level in the tank.

The various constructions detailed in this invention constitutes embodiments of the construction of the "Fuel Storage Tank Water Detector With Triggered Density" concept. It remains that anyone skilled in the art will realize that other aspects of this invention not mentioned constitute other embodiments related to the spirit of the technique utilized and remain within the scope of this invention.

The invention claimed is:

1. A water detector float adapted to work with a Magnetostrictive probe used as a tank level detector, comprising:
   a float sub-assembly having a protruded body interconnecting said float to a magnet carrying collar;
   a fixed boot situated at the lowest position of the said probe with the intent on being a means of support and locator for trigger weights;
   a trigger ledge on a float frame for automatically engaging the sub-assembly float to said trigger weights as the float rises to increase the density of the float sub-assembly when the density of the fuel is greater than that of the natural density of the float sub-assembly or when a water level reaches a set threshold.

2. The water detector float sub-assembly of claim 1, wherein the boot is set to carry one or more said trigger weights.

3. The water detector float sub-assembly of claim 1, wherein the density of said sub-assembly is established with said trigger weights embedded with said sub-assembly.

4. The water detector float sub-assembly of claim 1, wherein the trigger ledge is present to allow contact between said float sub-assembly and said trigger weights.

5. The water detector float of claim 1, wherein the location of a position magnet is reported by said Magnetostrictive probe to a console where said water level can be ascertained by algorithms.

6. The water detector float sub-assembly of claim 1, wherein said float sub-assembly contacts said trigger weights altering the density of the system.

7. A configuration permitting to further control the density of the water detector of claim 1, wherein a second trigger weight may be located at another known distance above said trigger weights to increase the water detector's density.

8. The water detector float sub-assembly of claim 1, wherein a low predetermined distance of travel to a first trigger point is established to minimize any sudden shift in the float's position when in high density fuel; the said distance also acts as a guardian against compromising water detection capabilities when the interface fuel density exceeds that of the float.

9. A weight carrying feature of the boot in claim 1, wherein the location of the trigger weights are accomplished by way of locking rings, wherein trigger distances can be adjusted as desired.

10. The water detector float sub-assembly of claim 6, wherein newly formed assembly is not restrained in its vertical rise along the probe's shaft in proportion to either water or other aqueous liquid level in the tank.

11. The float sub-assembly of claim 1, wherein the initial density of said float sub-assembly could be set, but not limited, to be approximately equal to 775 kg/m$^3$ in a gasoline tank.

12. The float sub-assembly of claim 1, wherein the density of said float sub-assembly could be brought to be approximately 810 to 820 kg/m$^3$ after making contact with a primary trigger weight, when only one such trigger weight is used.

13. The float sub-assembly of claim 1, wherein the density of said float sub-assembly could be brought to be approximately 790 to 810 kg/m$^3$ after making contact with the first trigger weight, when other trigger weights are used.

14. The float sub-assembly of claim 1, wherein the density of said float sub-assembly could be brought to be approximately 815 to 820 kg/m$^3$ after making contact with at least two trigger weights, when a multiplicity of said trigger weights are used.

15. A feature permitting to increase the accuracy of water presence measured by the water detector float assemblies found in claim 1, wherein algorithms described by a flowchart used in conjunction with temperature data from the Magnetostrictive probe are used to aid in accurately measure water presence in a gasoline tank.

16. A water detector float assembly wherein, a float sub-assembly is retrofitted with a telescopic trigger weight assembly, comprising:
- the float sub-assembly having a protruded body interconnecting said water detector float assembly to a magnet carrying collar;
- a series of trigger ledges located inside the float;
- a boot intended to isolate the probe's shaft from contacting the tank also serving as a locator for a telescopic trigger weight carrying apparatus;
- an engagement feature for linking the sub-assembly float to said telescopic trigger weight assembly to increase the density of the float sub-assembly when the density of the fuel is greater than that of the natural density of the float sub-assembly or when a water level reaches a set threshold.

17. The telescopic trigger weight carrying apparatus of claim 16, wherein the uppermost trigger weight is the first to establish contact with the float sub-assembly thereby altering the density of the float sub-assembly.

18. The telescopic trigger weight carrying apparatus of claim 16, wherein the external leg of the telescopic trigger weight assembly is terminated by a trigger point.

19. The water detector float sub-assembly of claim 16, wherein a low predetermined distance of travel to the first trigger point is established to minimize any sudden shift in the float position due to the presence of high density fuel and to act as a guardian against compromising water detection capabilities when the interface fuel's density exceeds that of the float.

20. A water detector float assembly wherein a float sub-assembly is used in conjunction with an external trigger weight assembly, comprising:
- the float sub-assembly having a protruded body interconnecting the water detector float assembly to a magnet carrying collar;
- a fixed boot situated at the lowest position of a Magnetostrictive probe shaft acting as a restraint for the water detector float assembly;
- a weight harness composed of two independent weights joined together by a gasoline or chemically resistant flexible membrane located above or below the float;
- an anchor point is affixed to the Magnetostrictive probe shaft by way of a set screw;
- an engagement feature for linking the float sub-assembly to said external trigger weight assembly to increase the density of the water detector when the density of a fuel is greater than that of the natural density of the float sub-assembly or when a water level reaches a set threshold.

21. The external trigger weight assembly of claim 20, wherein the location of the trigger weights are accomplished by way of a locking anchor ring, wherein a first trigger distance can be adjusted as desired.

22. The water detector float sub-assembly of claim 20, wherein a low predetermined distance of travel to a first trigger point is established to minimize any sudden shift in float position due to the presence of high density fuel and to act as a guardian against compromising water detection capabilities when the fuel's density exceeds that of the float.

23. The water detector float assembly of claim 20, wherein said float sub-assembly contacts a first trigger weight altering the density of the system.

24. The anchor point of claim 20, wherein it is made small enough to allow a restriction free passage of the trigger weights and the float sub-assembly thereby not restricting the system in its vertical rise and fall in proportion to the water level.

25. The anchor point of claim 20, wherein the anchor point is restricting the free passage of the uppermost weight, when the trigger weights are located above the water detector float assembly, allowing the trigger weights to remain suspended above the water float.

26. A water detector float assembly wherein the float sub-assembly is used conjunction with a mixed mode trigger weight assembly, comprising:
- a float sub-assembly having a protruded body interconnecting the water detector float assembly to a magnet carrying collar;
- a series of trigger points intended to be used as weight lifters;
- a locking ring situated at the very end of a Magnetostrictive probe shaft acting as a restraint for the water float;
- a weight carrying fixture having a large end where a primary trigger weight is internally situated;
- a narrow upper portion of the mixed mode trigger weight assembly running along the probe's shaft to a termination lip where a secondary trigger weight is located externally to the water detector float assembly;
- an engagement feature for linking the float sub-assembly to said mixed mode trigger weight assembly to increase the density of the float sub-assembly when the density of the fuel is greater than that of the natural density of the float sub-assembly or when a water level reaches a set threshold.

27. The water detector float sub-assembly of claim 26, wherein a low predetermined distance of travel to a first trigger point is established to minimize any sudden shift in a float position due to the presence of a high density fuel and to guard from compromising water detection capabilities when the fuel's density exceeds that of the water detector float assembly.

28. The water detector float assembly of claim 26, wherein said float sub-assembly contacts said first trigger weight altering the density of the float sub-assembly;
- a second trigger weight may be located at another known distance above said first trigger weight to further increase the system's density when such increase is needed.

29. The weight carrying fixture of claim 26, wherein the said is set to restrict the free passage of the uppermost trigger weight, allowing the trigger weights to remain suspended above the water float.

* * * * *